US009578288B2

(12) United States Patent
Chen et al.

(10) Patent No.: US 9,578,288 B2
(45) Date of Patent: Feb. 21, 2017

(54) PEER-TO-PEER DISTRIBUTED STORAGE FOR INTERNET PROTOCOL TELEVISION

(75) Inventors: Yih-Farn Chen, Bridgewater, NJ (US); Yennun Huang, Bridgewater, NJ (US); Jeremy Rahe, Berkeley, CA (US); Bin Wei, Basking Ridge, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 2189 days.

(21) Appl. No.: 11/811,357

(22) Filed: Jun. 8, 2007

(65) Prior Publication Data
US 2008/0307107 A1 Dec. 11, 2008

(51) Int. Cl.
*G06F 15/16* (2006.01)
*H04N 7/173* (2011.01)
*H04N 21/4147* (2011.01)
*H04N 21/472* (2011.01)
*H04N 21/4788* (2011.01)
*H04N 21/6375* (2011.01)
*H04N 21/643* (2011.01)
*H04N 21/854* (2011.01)
*H04L 29/06* (2006.01)
*H04L 29/08* (2006.01)

(52) U.S. Cl.
CPC ...... *H04N 7/17318* (2013.01); *H04L 65/4084* (2013.01); *H04L 65/607* (2013.01); *H04L 67/104* (2013.01); *H04L 67/108* (2013.01); *H04N 21/4147* (2013.01); *H04N 21/4788* (2013.01); *H04N 21/47202* (2013.01); *H04N 21/6375* (2013.01); *H04N 21/64322* (2013.01); *H04N 21/85406* (2013.01)

(58) Field of Classification Search
CPC ............... H04L 29/08306; H04L 29/08576; H04L 29/08144; H04L 29/08531; H04L 41/0896; H04L 5/0064; H04N 21/632
USPC ....................................................... 709/231
See application file for complete search history.

(56) References Cited

U.S. PATENT DOCUMENTS

| 7,650,376 | B1 * | 1/2010 | Blumenau ...................... 709/203 |
|---|---|---|---|
| 2002/0071388 | A1 * | 6/2002 | Bergsson et al. ............ 370/230 |
| 2002/0133491 | A1 * | 9/2002 | Sim et al. ......................... 707/10 |
| 2002/0163882 | A1 * | 11/2002 | Bornstein et al. ............ 370/227 |
| 2003/0126079 | A1 * | 7/2003 | Roberson et al. ............. 705/40 |
| 2003/0229900 | A1 | 12/2003 | Reisman |
| 2004/0111756 | A1 | 6/2004 | Stuckman et al. |
| 2004/0199601 | A1 | 10/2004 | Contarino |
| 2005/0021830 | A1 * | 1/2005 | Urzaiz et al. ................. 709/234 |
| 2005/0177624 | A1 | 8/2005 | Oswald et al. |
| 2005/0177745 | A1 | 8/2005 | Oswald et al. |
| 2005/0177853 | A1 | 8/2005 | Williams et al. |
| 2006/0007947 | A1 * | 1/2006 | Li et al. ......................... 370/432 |
| 2006/0053209 | A1 * | 3/2006 | Li .................................. 709/217 |
| 2006/0107100 | A1 | 5/2006 | Hayward |
| 2006/0117355 | A1 | 6/2006 | Dureau et al. |

(Continued)

*Primary Examiner* — Tom Y Chang
(74) *Attorney, Agent, or Firm* — Toler Law Group, PC

(57) ABSTRACT

A plurality of portions of a video content item is distributed to a plurality of peers, respectively, of a peer-to-peer network. Each of the plurality of portions encodes less than an entire portion of the video content item. A peer of the network retrieves at least a subset of the plurality of portions of the video content item from at least a subset of the peers. The at least the subset of the plurality of portions of the video content item enables recovery of the video content item by the peer.

9 Claims, 3 Drawing Sheets

(56) References Cited

U.S. PATENT DOCUMENTS

| | | |
|---|---|---|
| 2006/0190615 A1* | 8/2006 | Panwar et al. ................. 709/231 |
| 2006/0230176 A1 | 10/2006 | Dacosta |
| 2007/0038610 A1* | 2/2007 | Omoigui ........................... 707/3 |
| 2007/0039033 A1 | 2/2007 | Ota |
| 2007/0091885 A1 | 4/2007 | Yu et al. |
| 2007/0133691 A1* | 6/2007 | Kozat ...................... 375/240.24 |
| 2008/0065771 A1* | 3/2008 | Marvit et al. ................. 709/226 |
| 2008/0189429 A1* | 8/2008 | DaCosta ....................... 709/231 |
| 2008/0235746 A1* | 9/2008 | Peters et al. .................. 725/111 |

* cited by examiner

PEER-TO-PEER DISTRIBUTED STORAGE FOR INTERNET PROTOCOL TELEVISION

FIELD OF THE DISCLOSURE

The present disclosure is generally related to internet protocol television (IPTV) applications.

BACKGROUND

IPTV infrastructures comprise an IP Video Hub Office (VHO) which serves video content to multiple neighborhoods. A Fiber to the Neighborhood (FTTN) approach can be used to provide connections between the IP VHO and the neighborhoods. A connection between an IP VHO and a neighborhood may have a bandwidth of 1 Gbps, for example. Each connection may act as a bottleneck as a number of Video-on-Demand (VOD) users increases and requests shift from standard definition television (SDTV) content (which requires 2 Mps) to high definition television (HDTV) content (which requires 8 Mbps).

DETAILED DESCRIPTION OF THE DRAWINGS

Thus, providing a large number of HDTV-quality video streams to nodes in a neighborhood may strain a fiber link connecting the neighborhood to a video hub office or another video server. However, communication between peer nodes in the same neighborhood usually does not strain the fiber link. Disclosed herein are embodiments of a per-neighborhood, peer-to-peer data storage and retrieval network for video streaming and potentially other uses. In an embodiment, a storage system accelerates delivery of video streams by striping popular video content and treating peer nodes (or their corresponding set-top boxes) as storage. The storage differs from conventional Redundant Array of Inexpensive Disk (RAID) storage in that the individual storage elements provided by the peer nodes also request data from each other.

A forecast is made of which video content items will be subsequently requested in a time period. The forecast can be based on collected statistics for prior video content requests by IPTV customers, and a time-of-day, a day-of-week, and/or a geographical location of a neighborhood. The popular video content (e.g. a top N videos) are striped in the sense of RAID storage with redundancy and an error correction scheme, and are preemptively cached on peer nodes during a time when network usage is low (e.g. an off-peak time such as overnight). The error correction scheme can be used to ensure reliable content delivery in the midst of peer failures.

Embodiments provide reliable and high speed access to the stored data even if an upload bandwidth (e.g. 1 Mbps) at each node is limited compared to a download bandwidth (e.g. 20 Mbps) and if some or all of the nodes have transient connections to the network. For example, consider a community of 250 homes. When a request for a video content item is made by a peer, other peers can deliver low-bandwidth streams (e.g. 40 kbps) to meet the streaming requirement (e.g. 8 Mbps) of HDTV videos without incurring much processing/bandwidth overhead on each peer and without any interruption in video delivery due to the built-in redundancy and error correction scheme.

Also disclosed are embodiments of an incentive scheme that rewards peers who participate in the peer-to-peer data storage network.

Figure 1:
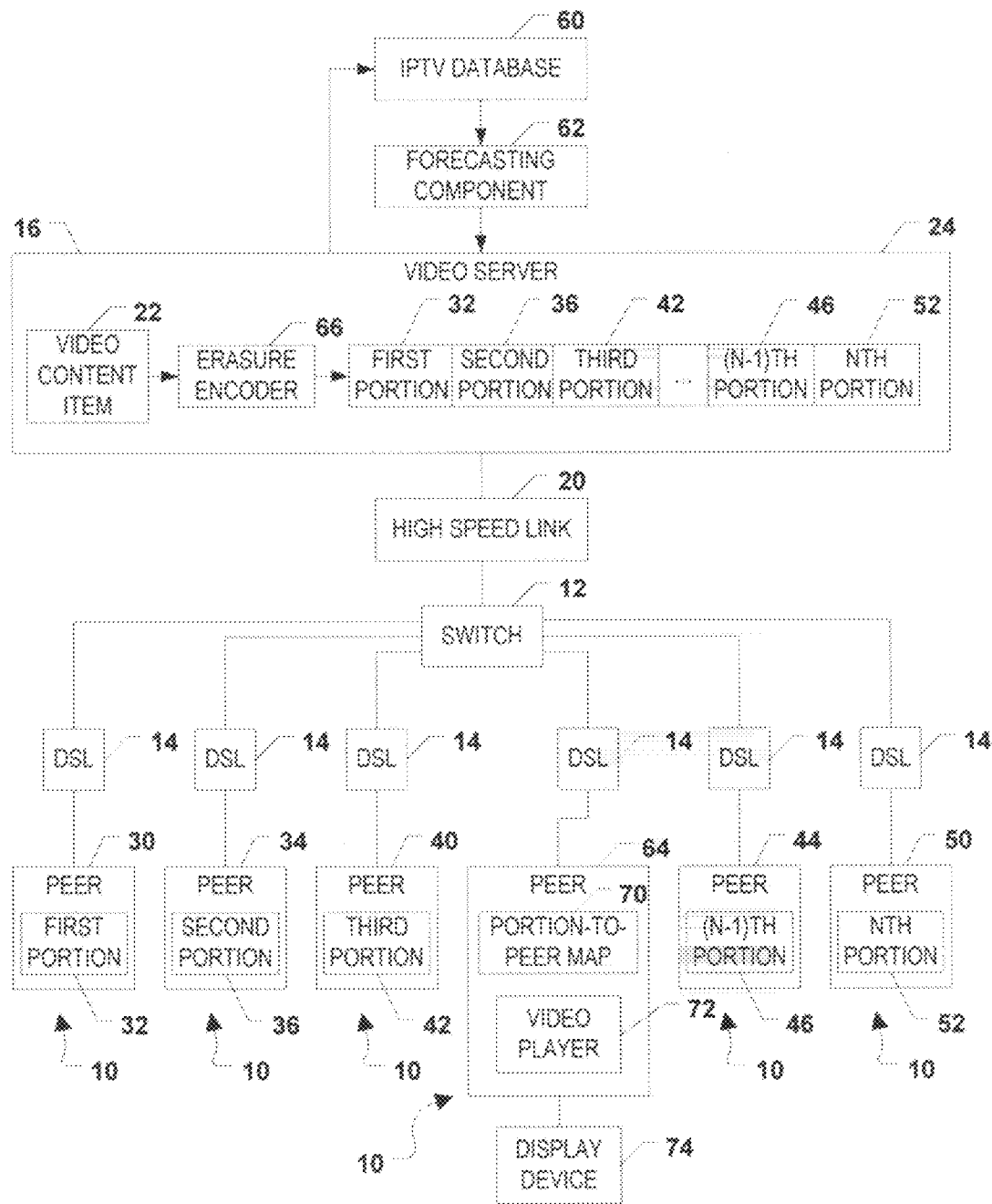
FIG. 1 is a block diagram of an embodiment of a network which provides video-on-demand movies and television to a plurality of homes in a neighborhood.

FIG. 1 is a block diagram of an embodiment of a network which provides video-on-demand (VoD) movies and television to a plurality of homes 10 in a neighborhood. The VoD movies and television may be provided by an IPTV service provider. The network may also provide other services such as an internet access service and a Voice over Internet Protocol (VoIP) service to the homes 10 in the neighborhood. Each of the homes 10 is connected to a neighborhood switch 12 via a respective bonded digital subscriber line (DSL) connection 14. The neighborhood switch 12 may serve 200 to 500 homes, for example. In an embodiment, each DSL connection 14 provides an upload bandwidth of about 1 Mbps and a download bandwidth of about 22 Mbps.

The switch 12 is connected to at least one server, such as a VoD server 16, of an Internet Service Provider (ISP) via a high speed link 20. The high-speed link 20 is used to carry both Internet and VoD traffic. In an embodiment, the high-speed link 20 is a fiber link having a bandwidth of about 1 Gbps. The VoD server 16 provides a central office, such as a video hub office, that serves a plurality of neighborhood switches, including the neighborhood switch 12, for a plurality of neighborhoods. The VoD server 16 is connected to the plurality of neighborhood switches by a plurality of high-speed links, respectively. In an embodiment, the VoD server 16 serves about 100 neighborhoods. The IPTV service may have a plurality of central offices, including the VoD server 16, each of which serves a respective plurality of neighborhoods.

The high-speed link 20 may act as a bottleneck to a number of simultaneous VoD streams that can be supported directly from the VoD server 16. Further, an amount of Internet bandwidth that the ISP can offer its customers in the homes 10 may be affected when many videos are streamed via the high speed link 20.

The switch 12 has a sufficiently large switching capacity to allow the homes 10 to communicate with each other at the speed of their bonded DSL connections 14 without having to use the high speed link 20. Thus, the switch 12 can be used to provide a peer-to-peer network to distribute and communicate video content items between the homes 10. The peer-to-peer network reduces the demand on the high speed link 20 and the VoD server 16.

In an embodiment, the peer-to-peer network is designed for a specific application of distributing movies and television items for a small number of peers such as 200 to 500 (or fewer peers), where peer availability is predictable, where a fixed latency exists between the peers, and where a central server stores a respective backup copy of all video files.

Use of a conventional peer-to-peer solution is problematic for distributing a video stream having a higher bit rate than the upload bandwidth of the bonded DSL connection 14. For example, the video stream may be an SDTV video stream that requires 2 Mbps, and the bonded DSL connection 14 may be limited to 1 Mbps upload bandwidth. In the above example, two peer homes that store the video could cooperate to upload the video with the required 2 Mbps to a requesting neighbor home, but would disadvantageously saturate their own DSL connections 14 thus preventing them from using their Internet connections.

Therefore, it is desirable to store the video among a larger number of peers so that they can cooperate to upload the video to a requesting neighbor without saturating their own DSL connections 14. It is also desirable for peers to store less than complete copies of the video in order to conserve their local storage capacity.

In an embodiment, each of a plurality of peers that are to communicate a video content item to one or more other peers do not store a complete copy of the video content item. For example, consider a neighborhood comprising N peers that, in aggregate, are to store a video content item 22. An entire copy of the video content item 22 may be stored by a central server 24 which provides backup copies of a plurality of different video content items. The central server 24 may be embodied by either the VoD server 16 or another server. In contrast to the central server 24, each of the N peers may store a respective portion of the video content item 22, and not the entire video content item 22. For example, a first, peer 30 may store a first portion 32, a second peer 34 may store a second portion 36, a third peer 40 may store a third portion 42, etc., up to an (N-1)th peer 44 storing an (N-1)th portion 46, and an Nth peer 50 storing an Nth portion 52. The first portion 32 through the Nth portion 52 are selected so that an aggregation thereof provides the entire video content item 22. The portions either may partition the video content item 22 or may overlap. Although overlapping portions provide redundancy in the peer-to-peer network, use of the central server 24 and an erasure code as subsequently described herein is preferred to provide the redundancy.

Each of the portions may have the same size, or may have different sizes. For equal-sized portions, if the video content item 22 has a size of F, then each of the N peers may store a respective portion of size F/N. For example, consider 100 peers that, in aggregate, are to store a 100 Mb video content item. A first peer may store at least a first Mb of the video content item, a second peer may store at least a second Mb of the video content item, etc., up to the 100th peer storing at least a 100th Mb of the video content item.

In an embodiment, the portions of the video content item 22 are pre-fetched to the peers before the peers have requested or viewed the video content item 22. Pre-fetching is suitable because movies and television shows are characterized by a high degree of predictability in what will be watched by end viewers. An IPTV database 60 stores historical data of previous requests for video content items by subscribers of an IPTV service. The historical data may be exclusive to the neighborhood, or may be for a plurality of neighborhoods. A forecasting component 62 uses the historical data to determine which video content items are most likely to be requested in a future time period by viewers in the neighborhood. The forecasting component 62 may also use time-of-day, day-of-week, and/or geographical location of the neighborhood to make the forecast. The forecast may be of a top-50 movies and a top-50 television shows, for example. The central server 24 distributes, to the peers, portions of the video content items (including the video content item 22) that are forecast to be requested in the future. The portions of the video content items (including the video content item 22) may be pre-fetched to the peers during off-peak hours and at less than a speed necessary for live streaming.

The portions of a video content item may be pre-fetched and stored by less than all of the peers. For example, five portions of a first video content item may be pre-fetched and stored by a first group of five of the peers, respectively. Similarly, five portions of a second video content item may be pre-fetched and stored by a second group of five of the peers, respectively, where the second group differs from the first group. In general, different subsets of the peers may be used to pre-fetch and store different video content items. For example, 200 peers may be grouped into 40 subsets of five peers, with each subset pre-fetching and storing a respective one of the top 40 movies. If the movies require a 2 Mbps stream and the DSL lines are limited to 1 Mbps upload bandwidth, then any of the top 40 different movies, once pre-fetched, can be streamed to a requesting peer, with each of the five uploading peers using only 40% of its upload bandwidth (one fifth of 2 Mbps is 0.4 Mbps, which is 40% of a 1 Mbps upload bandwidth).

Optionally, multiple groups of peers may pre-fetch and store the same video content item. This may occur if the video content item is a blockbuster movie, for example, or another video content item that is expected to popular and thus be more frequently requested in the future time period. Having multiple groups of peers store the same video content item enables multiple simultaneous viewers of the video content item without the same group being required to support multiple simultaneous requests. Although multicasting in a small switched network can be used for uploading to multiple viewers, re-streaming to one viewer a part that has been already watched by another viewer consumes higher bandwidth for an interval.

At any given time, some movies will be watched while other movies are not being watched. Peers that store parts of the currently-watched movies have part of their upload bandwidth being consumed by uploading their parts, while other peers may sit idle. To better balance a load of uploading video content items among the peers, the video content items can be divided into many small pieces. For example, a video content item can be divided into one-second clips of 250 kb that are evenly distributed throughout many peers of the peer-to-peer network.

To further balance the load, all uploading peers that are satisfying a request from a requesting peer 64 need not immediately send their pieces as fast as possible to the requesting peer 64. The requesting peer 64 can indicate, in a request to a serving peer, by what time the requesting peer 64 needs a particular piece of the video content item 22. Each serving peer can determine a minimum necessary bandwidth to serve the request. For example, if the requesting peer 64 indicates that the particular piece of size S bits will not be needed until T seconds later, the serving peer can determine that the particular piece can be sent to the requesting peer 64 at a bit rate of S/T over the T seconds. If T is 200 seconds, then a requested block can be sent at 10 kbps (1% of the upload bandwidth) over 200 seconds, rather than 1 Mbps (100% of the upload bandwidth) over a 2-second burst and then lying dormant for 198 seconds.

To improve fault tolerance, an error-correcting code (ECC) is employed before dividing the video content item into pieces. In an embodiment, an erasure code is selected as the ECC. In this embodiment, the video content item 22 is encoded by an erasure encoder 66 to form an erasure-encoded file, and the erasure-encoded file is divided into pieces. In general, an erasure-encoded file has a particular threshold, P %, such that the file can be recovered if any subset of P % or more is fetched. The particular threshold may be 80%, for example. Thus, if the requesting peer 64 receives at least P % of the pieces of the erasure-encoded file from the serving peers, then the requesting peer 64 can recover the entire video content item. The overhead associated with using erasure-encoding is less than the extra data that would result from storing extra copies of the data to be protected.

In an event that the peer-to-peer network fails to fetch one or more pieces of video content item data, the central server 24 is used to serve those pieces of a video content item. The fixed inter-peer latency allows for a quick detection of a server peer going down unexpectedly. In response thereto, the peer can issue an update message and high-priority block fetch to the central server 24. Thus, because of the central server 24, an amount of error correction can be selected to be efficient from a storage/bandwidth standpoint, rather than a worst-case scenario.

To determine which peers have a desired video content item, the requesting peer 64 can perform a lookup operation. The lookup can be performed either by broadcasting a search query or by implementing a distributed hash table (DHT). However, to reduce or eliminate lookup costs, blocks of video content items can be statically mapped to peers in the network. For example, the requesting peer 64 may store a portion-to-peer map 70 which maps the portions 32, 36, 42, 46 and 52 to the peers 30, 34, 40, 44 and 50, respectively. In this case, each requesting peer can use information indicating which peers are up/down to select a subset of the nodes that are up (i.e. operational to participate in satisfying a request for a piece of a video content item) to fulfill a request for a video content item. The requesting peer 64 can select the subset deterministically or randomly. For example, for an erasure-encoded video content item, the requesting peer 64 can use the up/down information to select at least P % (e.g. at least 80%) of the blocks for the video content item to request from the peers that are up. Static mapping can eliminate lookup costs due to the small, fixed membership of peers in the network and the use of error correction to obviate a need for shuffling block ownership.

The requesting peer 64 can receive the up/down information from the central server 24 either before or after making a request for a video content item. The central server 24 maintains various state information, including the up/down information, about the peers on the network. Long-term profiling information about which peers are up at which times may be used in tailoring an amount of error correction used in encoding the video content items.

The requesting peer 64 comprises a video player 72 which processes the portions of the video content item 22 retrieved from its peers. The video player 72 decodes the retrieved portions of the video content item 22 and outputs an associated video display signal to a display device 74. Based on the video display signal, the display device 74 displays the video content item 22 to a viewer.

The peers also may maintain a cache of video content items that they have watched, are watching, or are anticipated to watch. The cache may be used to enable viewers to rewind through a video content item or to view the video content item multiple times, for example. A movie may be cached, for example, at the home of a viewer who is renting the movie. By renting the movie, the viewer may be allowed to watch the movie either a limited or unlimited number of times and for either a limited or unlimited period of time. The video content items have been watched by a viewer can be tracked in order to predict another video content item that he/she will likely request in the future. In this case, the entire video content item can be pre-fetched to the viewer's local storage.

Communication in the network can be performed using User Datagram Protocol (UDP), with video software at each peer keeping its own re-order buffer. The re-order buffer at a peer may have a larger window than that provided by TCP. Use of UDP does not require having a large number of open TCP connections.

Peers can be incentivized in various ways to allow use of their spare upload bandwidth for peer-to-peer video distribution. Peers who participate may receive cash, may be subjected to fewer advertisements in video content items, may receive earlier access to new video content items such as movies (where the peers can subsequently stream these items to others), or may receive one or more free video content items per month.

Regardless of whether or not the IPTV provider schedules which peers stream to whom, the peers can keep track of how much data they have streamed. A micropayment system can allow micropayments to be exchanged between peers (e.g. from a receiving peer to an uploading peer) based on the streaming. Micropayments can be exchanged multiple times between peers without involving the IPTV provider. Privacy of transactions can be enabled by masking network addresses of the sender and the receiver, e.g. by using multicast subscription.

Figure 2:
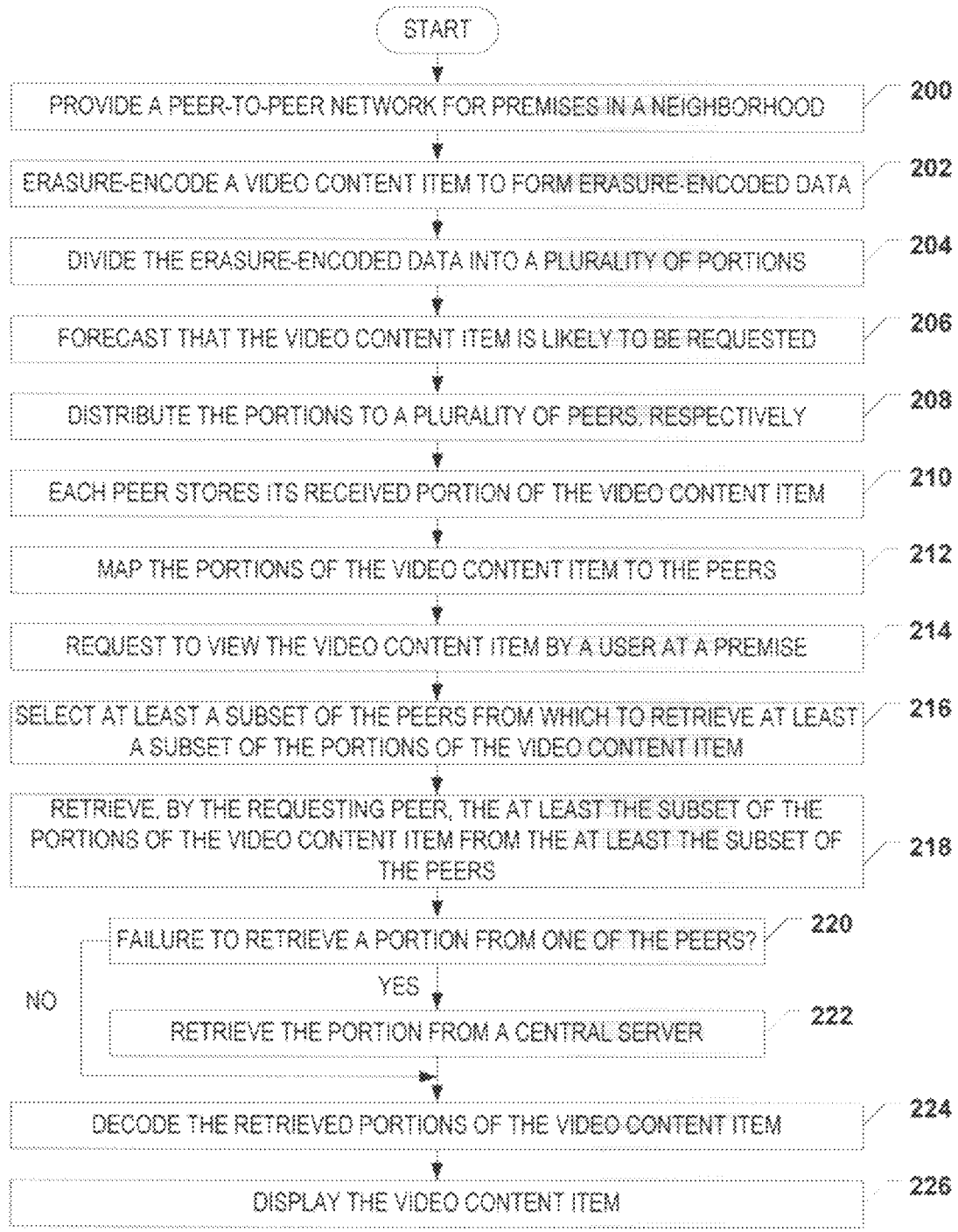
FIG. 2 is a flow chart of an embodiment of a method of providing video-on-demand movies and television to the homes.

FIG. 2 is a flow chart that summarizes an embodiment of a method of providing video-on-demand movies and televisions to premises in a neighborhood. The method can be used for full downloading, progressive downloading and/or streaming applications.

As indicated by block 200, the method comprises providing a peer-to-peer network for the premises in the neighborhood. The premises may comprise a plurality of homes, for example.

The peer-to-peer network comprises a switch that serves the plurality of premises, and a plurality of digital subscriber line (DSL) connections between the plurality of premises and the switch. Peers in the peer-to-peer network are disposed at the premises in the neighborhood. Each of the peers has customer premise equipment (CPE) comprising a transceiver to transmit and receive video content data via its DSL connection, a data storage device to store received video content data and other data, a decoder to decode received video content data, a video player to play decoded video content items, and a display device to display the decoded video content items to one or more viewers.

As indicated by blocks 202 and 204, the method comprises erasure-encoding a video content item to form erasure-encoded data and dividing the erasure-encoded data into the plurality of portions. The erasure-encoding has a threshold of P % such that the video content item can be recovered using any subset of P % or more of the plurality of portions. Alternatively, another error correcting code can be used to encode the video content item to form encoded data, with the encoded data being divided into a plurality of portions.

As indicated by block 206, the method comprises forecasting that the video content item is likely to be requested by at least one peer of the peer-to-peer network. The forecasting may be based on previous video content requests made to an Internet Protocol Television service.

As indicated by block 208, the method comprises distributing a plurality of portions of a video content item to a plurality of peers, respectively, of the peer-to-peer network. Each of the plurality of portions encodes less than an entire portion of the video content item. The portions are distributed from at least one video server (e.g. a video hub office) to the switch via at least one high-speed link, and from the switch to the plurality of peers via the DSL connections.

This act of distributing may be performed in response to the aforementioned act of forecasting.

As indicated by block 210, the method comprises each of the plurality of peers storing its received portion of the video content item. Each peer stores its received portion in the data storage device of its CPE.

As indicated by block 212, the method comprises mapping the plurality of portions of the video content item to the plurality of peers.

As indicated by block 214, the method comprises a user at a premise requesting to view the video content item.

As indicated by block 216, the method comprises selecting at least the subset of the peers from which to retrieve at least the subset of the plurality of portions based on said mapping. The at least the subset of the plurality of portions of the video content item enable recovery of the entire portion of the video content item by a peer at the premise desiring to view the video content item. The at least the subset of the peers from which to retrieve the at least the subset of the plurality of portions may be selected so that at least P % of the portions are included.

As indicated by block 218, the method comprises retrieving, by the requesting peer at the requesting premise and via the peer-to-peer network, the at least the subset of the plurality of portions of the video content item from the at least the subset of the peers. Peers in the at least the subset upload their respective portions via their DSL connections to the switch. The switch, in turn, communicates the portions to the requesting peer at the requesting premise.

Optionally, a peer can upload its portion based on a size S of the portion and a time T for which the portion is not needed by the retrieving peer. For example, the peer can upload its portion with a maximum upload rate based on S and T, e.g. S/T, or can spread uploading its portion over a duration based on T (e.g. over at least half of T, at least 80% of T, at least 90% of T, or substantially all of T).

As indicated by blocks 220 and 222, the method may comprise determining a failure to retrieve a portion of the video content item from one of the peers, and retrieving the portion of the video content item from a central server in response to said determining the failure.

As indicated by blocks 224 and 226, the method comprises decoding, by the peer, the retrieved portions of the video content item, and displaying the video content item based on said decoding.

Embodiments of the herein-disclosed method and system can be used in other applications such as DVD storage, music collection storage, video sharing, and video blogging. By striping and storing an entire DVD collection at the peers, viewers can select a particular movie from a menu rather than shuffling through disks to play the movie. The IPTV service may limit network access to the DVD collection based on its own offering of videos on demand. For video sharing, a peer can stripe a home video or a non-copyright video onto the peer-to-peer network. The peer can send, to its family and friends, a link to the video striped on the peer-to-peer network.

Embodiments can be modified for use in general networks (e.g. which may or may not be a peer-to-peer network). For example, some of the acts disclosed herein can be performed by one or more nodes of the network that are not peers.

Figure 3:
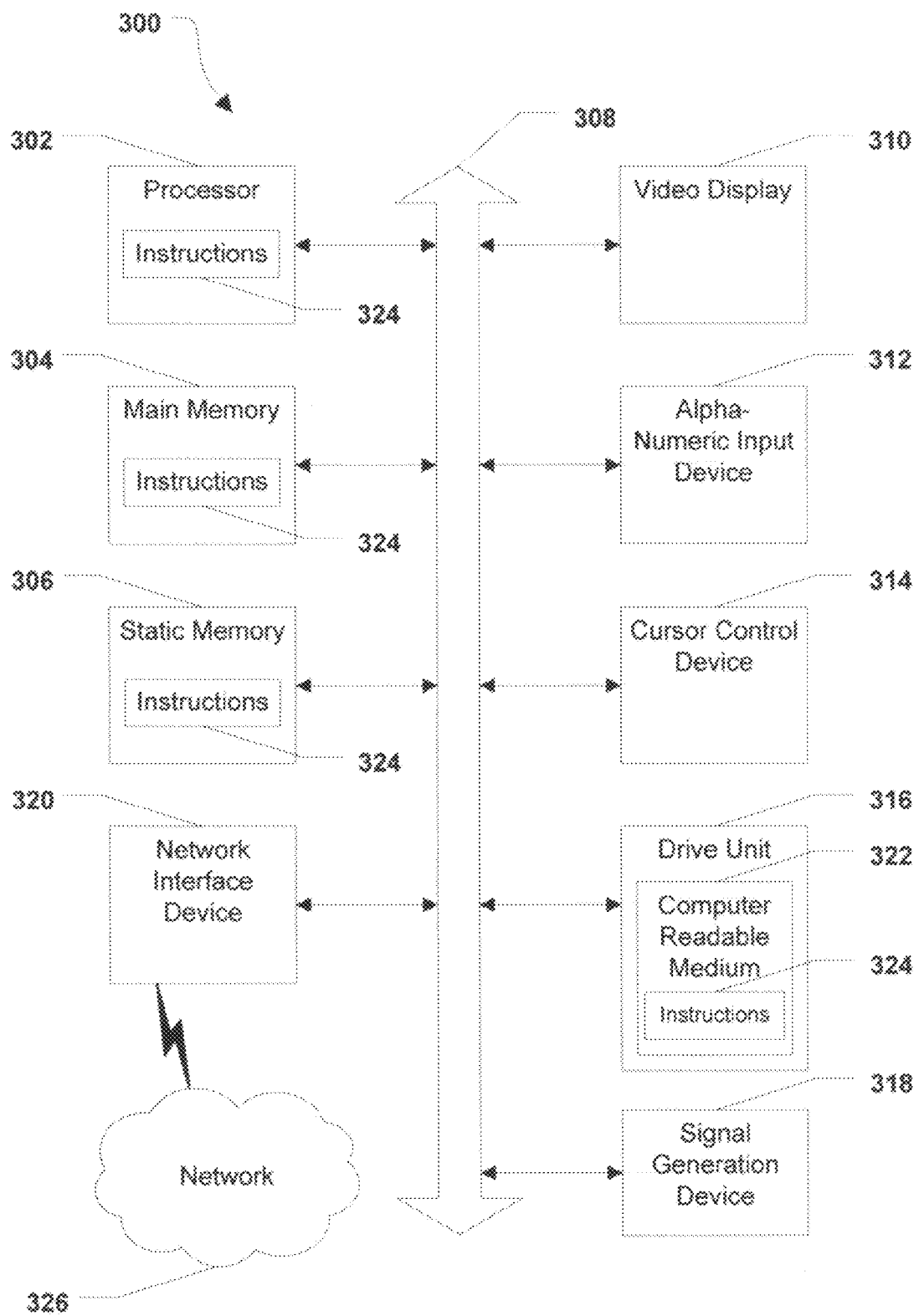
FIG. 3 is a block diagram of an illustrative embodiment of a general computer system.

Referring to FIG. 3, an illustrative embodiment of a general computer system is shown and is designated 300. The computer system 300 can include a set of instructions that can be executed to cause the computer system 300 to perform any one or more of the methods or computer based functions disclosed herein. The computer system 300 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 300 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 300 can be implemented using electronic devices that provide voice, video or data communication. Further, while a single computer system 300 is illustrated, the term "system" shall also be taken to include any collection of systems or sub-systems that individually or jointly execute a set, or multiple sets, of instructions to perform one or more computer functions.

As illustrated in FIG. 3, the computer system 300 may include a processor 302, e.g., a central processing unit (CPU), a graphics processing unit (GPU), or both. Moreover, the computer system 300 can include a main memory 304 and a static memory 306, that can communicate with each other via a bus 308. As shown, the computer system 300 may further include a video display unit 310, such as a liquid crystal display (LCD), an organic light emitting diode (OLED), a flat panel display, a solid state display, or a cathode ray tube (CRT). Additionally, the computer system 300 may include an input device 312, such as a keyboard, and a cursor control device 314, such as a mouse. The computer system 300 can also include a disk drive unit 316, a signal generation device 318, such as a speaker or remote control, and a network interface device 320.

In a particular embodiment, as depicted in FIG. 3, the disk drive unit 316 may include a computer-readable medium 322 in which one or more sets of instructions 324, e.g. software, can be embedded. Further, the instructions 324 may embody one or more of the methods or logic as described herein. In a particular embodiment, the instructions 324 may reside completely, or at least partially, within the main memory 304, the static memory 306, and/or within the processor 302 during execution by the computer system 300. The main memory 304 and the processor 302 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 324 or receives and executes instructions 324 responsive to a propagated signal, so that a device connected to a network 326 can communicate voice, video or data over the network 326. Further, the instructions 324 may be transmitted or received over the network 326 via the network interface device 320.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
receiving via a peer-to-peer network at a first set-top box, a request for a portion of video content from a second set-top box, wherein the request indicates a time that delivery of the portion of video content to the second set-top box is to be completed, wherein the first set-top box determines a bandwidth threshold for serving the request based on the time, and wherein the video content is encoded into a plurality of portions including the portion, each portion of the plurality of portions less than an entire portion of the video content;
performing, at the first set-top box, load balancing with respect to the peer-to-peer network by:
determining, at the first set-top box, to transmit the portion to the second set-top box using less than an available upload bandwidth of the first set-top box; and
in response to determining to transmit the portion to the second set-top box using less than the available upload bandwidth, determining, at the first set-top box based on a size of the portion and the time, an upload rate to transmit the portion from the first set-top box to the second set-top box, the upload rate corresponding to a bandwidth that is less than the available upload bandwidth and greater than or equal to the bandwidth threshold; and transmitting the portion from the first set-top box to the second set-top box in accordance with the upload rate.

2. The method of claim 1, wherein the peer-to-peer network comprises a plurality of digital subscriber line connections between a plurality of set-top boxes and a switch.

3. The method of claim 1, wherein the video content is erasure-encoded video content.

4. The method of claim 3, wherein the erasure-encoded video content has a threshold percentage such that the video content can be recovered using a percentage of the plurality of portions that is greater than or equal to the threshold percentage of the plurality of portions.

5. The method of claim 1, wherein the upload rate does not exceed S/T, where S is the size of the portion and where T is an amount of time remaining until the portion is to be received at the second set-top box.

6. The method of claim 1, wherein the upload rate is such that the first set-top-box spreads uploading the portion over at least half of T, where T is an amount of time remaining until the portion is to be received at the second set-top box.

7. The method of claim 1, further comprising receiving an incentive in exchange for participating in a peer-to-peer distribution of the portion of video content, wherein the incentive includes: a reduction in advertisements in video content received at the first set-top box, a monetary payment, early access to a new video content item, free video content, a micropayment from the second set-top box in exchange for the portion, or any combination thereof.

8. The method of claim 1, wherein the upload rate enables streaming of the video content to the second set-top box without interruption.

9. The method of claim 7, wherein when the micropayment is received, the micropayment is received without intervention from a content provider associated with the peer-to-peer network.

* * * * *